United States Patent [19]

Hwang et al.

[11] Patent Number: 5,413,972
[45] Date of Patent: * May 9, 1995

[54] SIALON COMPOSITES AND METHOD OF PREPARING THE SAME

[75] Inventors: Chinmau J. Hwang; Donald R. Beaman; David W. Susnitzky, all of Midland, Mich.

[73] Assignee: The Dow Chemical Company, Midland, Mich.

[*] Notice: The portion of the term of this patent subsequent to Jul. 13, 2010 has been disclaimed.

[21] Appl. No.: 178,377
[22] Filed: Dec. 23, 1993
[51] Int. Cl.$^6$ ................................................. C04B 35/58
[52] U.S. Cl. .......................................... 501/98; 264/65
[58] Field of Search ........................ 501/96, 98; 264/65

[56] References Cited

U.S. PATENT DOCUMENTS

| | | | |
|---|---|---|---|
| 4,243,621 | 1/1981 | Mori et al. | 264/65 |
| 4,711,644 | 12/1987 | Yeckley et al. | 501/98 X |
| 4,826,791 | 5/1989 | Mehrotra et al. | 501/89 |
| 4,845,059 | 7/1989 | Kohtoku et al. | 501/98 |
| 4,935,389 | 6/1990 | Umebayashi et al. | 501/98 |
| 5,030,600 | 7/1991 | Hida et al. | 501/98 |
| 5,032,553 | 7/1991 | Tarry | 501/98 X |
| 5,112,780 | 5/1992 | Goto et al. | 501/95 |
| 5,120,328 | 6/1992 | Pyzik | 51/309 |
| 5,200,374 | 4/1993 | Yamada et al. | 501/98 |
| 5,227,346 | 7/1993 | Hwang et al. | 501/96 |

OTHER PUBLICATIONS

D. R. Clarke, "Thermodynamic Mechanism for Cation Diffusion Through an Intergranular Phase" *Progress in Nitrogen Ceramics*, 1983, pp. 421–426 no month.
Wei–Ying Sun, "Subsolidus Phase Relationships in Part of the System . . . ", J. Am. Ceram Soc. 74(11) 2753–58 Nov. (1991).
Persson et al., "Oxidation Behaniour and Mechanical Properties of β– and Mixed α–β–Sialons Sintered with Additions of Y$_2$O$_3$ and Nd$_2$O$_3$", J. European Ceram Soc, 11 (1993) 363–272.
R. E. Tressler, "High–Temperature Stability of Non–Oxide Structural Ceramics", MRS Bulleta in 18(9) 58–63 Sep. (1993).
P. Andrews et al., "The Microstructure and Composition of Oxide Films Formed . . . ", J. Europ. Ceram Soc 5 (1989) 245–256 no month.
Yen et al., "Phase Relationship Studies of Silicon Nitride System—A Key to Materials Design", Mat. Res. Soc. Symp. Proc., vol. 287, pp. 39–50 no month no year.
Bergman et al., "The Si–Al–O–N System at Temperatures of 1700–1775° C", J Europ. Ceram. Soc 8 (1991) 141–151 no month.
Cannard et al., "The Formation of Phases in the AIN––rich Corner of the Si–Al–O–N System", J. Europ. Ceram, Soc 8 (1991) 375–382 no month.
Tanaka et al., "Hot Isostatic Press Sintering and Properties of Silicon Nitride Without Additives", J. Am. Ceram. Soc. 72(9) 1656–60 (1989) no month.
Zeng et al., "High Temperature Strength and Cavitation Threshold of Silicon Nitride–Silica Ceramics", Institute of Scientific and Industrial Research no month no year.
Wada et al., "Microstructure and Properties of α/βSiAlON Composite", The 34th Japan Congress On Materials Research, Mar. 1991, pp. 29–33.
Ekstrom et al., "SiAlON Ceramics", J. Am. Ceram. Soc. 75(2) 259–76 (1992) no month.
Ekstrom, "Preparation and Properties of α–Si–Al–O–N Ceramics", J Hard Materials, 3(2) 1992 no month.
Redington, et al., "α–SiAlON Ceramics Containing Mixed Modifying Cations, Ceramic Materials & Components for Engines", pp. 127–138 no month no year.

*Primary Examiner*—Karl Group

[57] ABSTRACT

A dense, substantially glass free, SiAlON ceramic material and method of making such material. The material has at least an alpha-SiAlON phase and a beta-SiAlON phase and exhibits excellent high temperature oxidation resistance and strength, good room temperature toughness and hardness, and a density greater than at least 95 percent of theoretical. The method of making the ceramic material is simple and includes adding AlN in an amount sufficient to allow formation of a desired amount of alpha-SiAlON, and in addition, convert SiO$_2$ and Al$_2$O$_3$ into the beta-SiAlON phase, preferably, by adding AlN in an amount between about $1.3X + 0.08Y - 0.0045XY$ and about $1.3X + 0.2Y - 0.0024XY$, wherein X is a weight percent of the SiO$_2$ based on total weight of the Si$_3$N$_4$ in the mixture and Y is a weight percent of alpha-SiAlON phase desired.

19 Claims, No Drawings

SIALON COMPOSITES AND METHOD OF PREPARING THE SAME

This invention relates generally to SiAlON composites and a method of preparing the same. More particularly, this invention relates to SiAlON materials having no greater than 3 volume percent of intergranular amorphous phase and further having at least an alpha-SiAlON phase and a beta-SiAlON phase.

BACKGROUND OF THE INVENTION

"SiAlON"s are phases in silicon-aluminum-oxygen-nitrogen and related systems, comparable in variety and diversity with mineral aluminosilicates. They contain one-, two-, and three-dimensional arrangements of silicon oxide tetrahedra in which silicon and oxygen atoms are partially replaced by aluminum and nitrogen. See K. H. Jack, "Sialons and related nitrogen ceramics," 11 *J. of Materials Sci.* 1135-58 (1976). Ceramic materials made from SiAlON typically have high toughness, and elevated temperature strength and oxidation resistance. These properties have made SiAlON ceramics a desirable candidate for many high temperature industrial applications.

In an attempt to provide a ceramic SiAlON composition which is usable in high temperature applications, prior art methods and compositions have taught the combination of alpha-SiAlON with beta-SiAlON. Typically, alpha-SiAlON, which appears mostly as fine equiaxed grains in the microstructure of the material, is associated with hardness in the material. On the other hand, beta-SiAlON mostly appears as elongated fiber-like grains in the microstructure. See Hwang et al., U.S. Pat. No. 5,227,346. Since, the beta-SiAlON material is elongated, it adds strength and fracture toughness to the material. Consequently, it is an advantage for a material made of SiAlON to incorporate both alpha-phase and beta-phase SiAlON. By varying starting materials in the SiAlON composition, it is possible to vary the alpha- to beta-SiAlON phase ratio. This will give rise to a series of materials where hardness and fracture toughness can be tailored.

A common problem with multi-phase SiAlON sintered bodies is that one or more minor phases, generally intergranular amorphous (glassy) phases, are formed at grain boundaries between the alpha- and beta-SiAlON phases. These intergranular glasses are undesirable because they generally cause high temperature degradation and reduction of the overall strength of the ceramic material. The intergranular glasses also cause the bodies to have lower oxidation resistance, especially at high temperatures. This may lead to reduced mechanical reliability such as load-bearing capability of the sintered bodies. For a discussion of negative implications of oxidation in ceramics, see Tressler, "High-Temperature Stability of Non-Oxide Structural Ceramics", 18[9] *MRS Bull.* 58-63 (1993). For this reason, it would be advantageous to provide a multi-phase SiAlON material with minimal or no intergranular glasses.

Prior art compositions and methods have attempted to rid the SiAlON materials of these glassy phases. For example, since oxide sintering additives contribute to the formation of glasses which remain at grain boundaries, attempts have been made to eliminate these additives from starting materials. However, these methods typically produce ceramic bodies that are difficult, if not impossible, to fully densify. Eliminating the additives from the starting materials also changes the microstructure of the resulting sintered bodies, inhibiting formation of elongated grains, and thus, impairing mechanical properties.

Another method of removing the glasses from a ceramic body is a post-fire heat treatment. In this method, a densified ceramic body containing an intergranular amorphous phase is exposed to temperatures between about 1000° C. and 1600° C. in order to promote crystallization of the glassy phase. The crystallized phase provides better resistance to degradation at higher temperatures than the glass. However, a problem with post-fire heat treatment is that complete crystallization may be inhibited by kinetic factors such as a large volume change upon crystallization that causes stress in glass residues which are constrained by surrounding grains. Even if complete crystallization occurs, the temperature at which strength degradation is observed is only raised to a temperature somewhere between the glass melting point (typically about 900° C. to 1000° C.) to that of an eutectic temperature along the SiAlON grain-boundaries (typically about 1200° C. to 1500° C.).

Another method of removing glass from ceramic bodies is by chemical or thermal leaching. Such a process is described in Clarke, "Thermodynamic Mechanism for Cation Diffusion Through an Intergranular Phase: Application to Environmental Reactions with Nitrogen Ceramics," *Progress in Nitrogen Ceramics* 421 (Martinus Nijhoff Publishers 1983). However, this type of method is complicated, too tedious, not efficient, and is generally difficult to control.

In order to encourage reduction of the volume percent of intergranular amorphous phase, some methods add higher amounts of AlN to the SiAlON composition. See, e.g.'s, T. Ekstrom and M. Nygren, "SiAlON Ceramics", 75[2] *J. Am. Ceram. Soc.* 259, 268 (1992) (addition of an "excess" 2 wt % AlN to the starting mixture), and T. Ekstrom, "Preparation and Properties of Alpha—Si—Al—O—N Ceramics," 3[2] *J. of Hard Materials* 109, 113-14 (1992). However, these methods have problems similar to those described above and, typically, only reduce the glass to a range of between about 3 to 6 volume percent. The methods are further complicated in multi-phase SiAlON systems. In multi-phase systems, due to intricate phase relationships, even slight changes in starting compositions produce numerous undesirable end products. For example, see Sun et al., "Subsolidus Phase Relationships in Part of the System Si, Al, Y/N, O: The System $Si_3N_4$—AlN—YN—$Al_2O_3$—$Y_2O_3$," 74[11] *J. Am. Ceram. Soc.* 2753-58 (1991). Phase relationships are further affected by surface oxides, inherent in nitride raw materials. In most cases, the surface oxides result in either intergranular amorphous phases or undesirable crystalline phases. Thus, adding higher amounts of AlN in order to significantly lower the glass content (e.g. <3 volume percent glass) has not been applied to SiAlON ceramics having both alpha- and beta-SiAlON phases.

It would be desirable to have a method of forming a dense multi-phase SiAlON ceramic material having no greater than three volume percent of intergranular amorphous phase, but not having the above identified problems.

SUMMARY OF THE INVENTION

In a first aspect, this invention is a SiAlON ceramic material having no greater than 3 volume percent of intergranular amorphous phase and further having at least two phases comprising:
  (a) a first phase of alpha-SiAlON represented by the general formula $M_x(Si,Al)_{12}(O,N)_{16}$, wherein $0 < X < 2$ and M is at least one cationic element selected from the group consisting of Li, Na, Mg, Ca, Sr, Ce, Y, Nd, Sm, Gd, Dy, Er, and Yb; and
  (b) a second phase of beta-SiAlON represented by the general formula $Si_{6-y}Al_yO_yN_{8-y}$, wherein $0 < y \leq 4.3$.

The ceramic material exhibits excellent high temperature (e.g. above 1200° C.) oxidation resistance and strength and has good room temperature (about 23° C.) toughness and hardness. In addition, although the intergranular amorphous phase is no greater than 3 volume percent based on the total volume of the material, preferably less than 1 volume percent, density of the ceramic material is greater than 95 percent of theoretical, preferably greater than 99 percent.

In a second aspect, this invention is a method for producing the SiAlON ceramic material of the first aspect. The method includes the steps of:
  (a) preparing a mixture of precursor materials including $Si_3N_4$, AlN, optionally $SiO_2$, optionally $Al_2O_3$, and at least one oxygen or nitrogen derivative of an element selected from the group consisting of Li, Na, Mg, Ca, Sr, Ce, Y, Nd, Sm, Gd, Dy, Er, and Yb,
    wherein $SiO_2$, including surface oxide from $Si_3N_4$, is present in the mixture in an amount no greater than 5 weight percent of the total weight of the $Si_3N_4$,
    $Al_2O_3$, including surface oxide from AlN, is present in the mixture in an amount no greater than 6 weight percent based on total weight of the AlN,
    the $Si_3N_4$ is present in the mixture in a range from about 70 to about 95 weight percent based on total weight of the mixture, and
    the AlN is present in the mixture in an amount sufficient to form a desired amount of alpha-SiAlON and to convert the $SiO_2$ and $Al_2O_3$ into the beta-SiAlON phase, yet insufficient to form AlN polytypoids; and
  (b) subjecting the mixture to a pressure, temperature, and period of time sufficient to densify the mixture.

In a preferred embodiment of this aspect of the invention, the amount of AlN in the mixture is a weight percent, based on the total weight of the mixture, between about $1.3X + 0.08Y - 0.0045XY$ and about $1.3X + 0.2Y - 0.0024XY$, wherein X is the weight percent of the $SiO_2$ based on total weight of the $Si_3N_4$ and Y is between 0 and 100 and is equal to a weight percent of alpha-SiAlON phase desired in the ceramic material.

This aspect of the invention discloses a simple way of preparing a substantially glass-free SiAlON ceramic material having at least alpha- and beta-SiAlON phases, as disclosed in the first aspect of this invention.

DETAILED DESCRIPTION OF THE INVENTION

Generally, this invention provides a dense, multi-phase SiAlON ceramic material having no greater than three volume percent of intergranular amorphous phase and comprising a mixture of at least an alpha-SiAlON phase and a beta-SiAlON phase. The ceramic material exhibits excellent high temperature oxidation resistance and strength and has good room temperature toughness and hardness.

The alpha-SiAlON phase of this invention is represented by the general formula $M_x(Si,Al)_{12}(O,N)_{16}$. In this general formula, "M" is at least one cationic element selected from the group consisting of Li, Na, Mg, Ca, Sr, Ce, Y, Nd, Sm, Gd, Dy, Er, and Yb. "x" is a number greater than zero, but less than or equal to two. If the value of x exceeds 2, there will not be enough interstitial sites available in the lattice to accept the M cation, thus leading to formation of secondary phases and glass. Preferably, x is less than 1. Micrographs taken with a transmission electron microscope (TEM), or a scanning electron microscope (SEM), reveal that the alpha-SiAlON phase is crystalline, containing mostly fine equiaxed grains along with a small amount of fine elongated grains, each grain having a diameter less than 0.5 micrometer (μm). In a preferred multi-phase SiAlON ceramic material, M is a multicationic mixture of Sr, Ca, and Y. Another preferred embodiment is when M is a multicationic mixture of Mg, Ca, and Y.

The beta-SiAlON phase of this invention is represented by the general formula $Si_{6-y}Al_yO_yN_{8-y}$, wherein $0 < y \leq 4.3$. However, even within the above described range, if the value of y is too large, excessive grain growth may result. Excessive grain growth leads, in turn, to formation of large pores in the resulting materials. The large pores typically lead to a reduction in the strength and oxidation resistance of the ceramic material. Therefore, the value of y should, preferably, be larger than 0 but not more than 2, most preferably, not more than 1. An SEM of the beta-SiAlON phase of the preferred embodiment of this invention reveals large elongated grains having diameters greater than 0.3 μm, most preferably, greater than 0.5 μm.

A significant part of this invention is the presence of no greater than three volume percent of intergranular amorphous phase (glassy phase) based on total volume of the SiAlON ceramic material. Preferably, no greater than one volume percent of glassy phase is present. The glassy phase, when present, typically comprises Si, Al, O, N, and M, wherein M is the same cation, or mixture of cations, that are present in the alpha-SiAlON phase. By eliminating or substantially reducing the glassy phase many beneficial properties such as excellent high temperature oxidation resistance and strength, as well as good room temperature toughness and hardness is obtained.

The mechanical properties of the SiAlON ceramic material are readily measured by use of standard tests. In particular, for purposes of this invention, the material is evaluated for oxidation resistance, Vicker's Hardness, Palmqvist Toughness, fracture toughness, flexure strength (modulus of rupture), and flexure strength retention. These standard tests are described in numerous previous publications. With the exception of oxidation resistance and flexure strength retention, these testing methods are described in Hwang et al., U.S. Pat. No. 5,227,346, col. 9, line 18 through col. 10, line 15 (incorporated herein by reference). Flexure strength retention, which measures the percentage of flexure strength retained at elevated temperature versus that at room-temperature, is calculated by dividing elevated temperature (e.g. 1375° C.) flexure strength by room temperature (about 23° C.) flexure strength, and multiplying by 100.

Oxidation measurements are reported as mass gain per unit area at a specified temperature and for a given amount of time. For example, in air oxidation of the material of this invention is no greater than 0.25 mg/cm$^2$ at 1400° C. for 100 hours and no greater than 1.00 mg/cm$^2$ at 1500° C. for 50 hours. In contrast, SiAlON compositions having greater than three volume percent of intergranular amorphous phase generally have significantly higher oxidation values. See, e.g., Persson et al., "Oxidation Behaviour and Mechanical Properties of β- and Mixed α-β-Sialons Sintered with Additions of Y$_2$O$_3$ and Nd$_2$O$_3$," 11 *J. Eur. Ceramic Soc.* 363–73 (1993).

The Vickers Hardness test measures the resistance of a ceramic material to indentation. The room temperature Vickers Hardness number of the SiAlON ceramic material of this invention is at least about 1650 kg/mm$^2$. However, generally speaking, by increasing alpha-SiAlON content (above 10 weight percent) and decreasing glass content (below 3 volume percent), high hardness values (above 1700 kg/mm$^2$) are easily obtainable with this invention. Preferably, the Vickers Hardness number ranges from about 1650 kg/mm$^2$ to about 2100 kg/mm$^2$ at room temperature; more preferably, from about 1750 kg/mm$^2$ to about 2000 kg/mm$^2$. In addition, the flexure strength retention of the material is at least 55 percent at 1375° C. in air. Preferably, the flexure strength retention is at least 65 percent at 1375° C. in air.

Room temperature fracture toughness, which measures the resistance of a material to fracture under a dynamic load, is greater than about 4.0 MPa (m)$^{\frac{1}{2}}$, as measured by the Chevron notch technique when the loading displacement rate is 1 μm/min. The room temperature fracture toughness generally ranges from about 4.0 MPa (m)$^{\frac{1}{2}}$ to about 7.5 MPa (m)$^{\frac{1}{2}}$. Preferably, the room temperature fracture toughness is at least 5.0 MPa (m)$^{\frac{1}{2}}$.

The SiAlON bodies of this invention exhibit a room temperature Palmqvist toughness, which is an extension of the Vickers Hardness test, of at least about 25 kg/mm. Preferably, the ceramic body of this invention exhibits a Palmqvist toughness at room temperature within a range of from about 28 kg/mm to about 45 kg/mm; more preferably, from about 32 kg/mm to about 40 kg/mm.

The alpha- and beta-SiAlON phases may be present in any amount as long as both phases are present in the ceramic material. Physical properties of the SiAlON composites can be altered by changing the ratio of the alpha and beta-SiAlON phases. For example, by increasing the percentage of alpha-phase, hardness of the material increases and toughness of the material decreases. Generally, a weight ratio of alpha- to beta-SiAlON, measured by a peak height ratio from X-ray diffraction (XRD) patterns, is anywhere from about 1:99 to about 90:10. Below 1:99, the material is typically more difficult to densify and above 90:10 strength and toughness diminish. Preferably, the weight ratio is between about 10:90 and about 40:60.

Preferably, the SiAlON ceramic material of this invention is substantially fully dense, having no significant porosity and a density of greater than 95 percent of the theoretical value. More preferably, the density is greater than 97 percent of the theoretical value; and most preferably, greater than 99 percent of the theoretical value.

The SiAlON ceramic materials of this invention are prepared by densifying a powder mixture of precursor materials. The precursor materials include Si$_3$N$_4$, AlN, optionally SiO$_2$, optionally Al$_2$O$_3$, and at least one oxygen or nitrogen derivative of an element selected from the group consisting of Sr, Ca, Mg, Li, Na, Ce, Y, Nd, Sm, Gd, Dy, Er, and Yb.

The Si$_3$N$_4$ precursor material used in preparing the ceramic material of this invention is present in an amount which is suitably within a range of from about 70 to about 95 weight percent (wt-%) based on total weight of the mixture. The Si$_3$N$_4$ can be any Si$_3$N$_4$ powder, including the crystalline forms of alpha-Si$_3$N$_4$ and beta-Si$_3$N$_4$, or noncrystalline amorphous Si$_3$N$_4$, or mixtures thereof. However, the preferred form of Si$_3$N$_4$ powder has a high purity and a high alpha/beta weight ratio. In addition, the powder may be of any size or surface area provided the ceramic material of this invention is obtained. Preferably, the particles have an average diameter within a range of from about 0.2 μm to about 5.0 μm; more preferably, from about 0.2 μm to about 1.0 μm. The powder has a surface area that is desirably within a range of from about 5 m$^2$/g to about 15 m$^2$/g, as determined by the Brunauer-Emmett-Teller (BET) method of measuring surface area, which is described in C. N. Satterfield, *Heterogeneous Catalysis in Practice* 102–05 (McGraw-Hill Book Company, 1980). The range is preferably from about 8 m$^2$/g to about 12 m$^2$/g.

Oxygen is inherently introduced into the mixture, usually as oxide or oxynitride coatings on surfaces of starting powders such as Si$_3$N$_4$ and AlN particles. Although it may be possible for the oxygen to be present in other forms, it is generally believed to exist predominantly in the form of SiO$_2$ and Si—O—N on the Si$_3$N$_4$ and Al$_2$O$_3$ and Al—O—N on the AlN. For calculation purposes, one skilled in the art will be able to convert any oxygen content to an equivalent content of SiO$_2$ and Al$_2$O$_3$. Thus, for purposes of this invention, the oxygen content of the mixture is identified in terms of wt-% of SiO$_2$ and Al$_2$O$_3$.

The amount of SiO$_2$ and Al$_2$O$_3$ introduced inherently from the Si$_3$N$_4$ and AlN particles varies according to the purity of the starting powders and their methods of manufacture. Typically, the amount of SiO$_2$, introduced naturally through the Si$_3$N$_4$ powder, ranges from about 1.5 to about 5.0 wt-%, based on the total weight of the Si$_3$N$_4$. Thus, for purposes of this invention, any given wt-% of Si$_3$N$_4$ or AlN inherently includes its respective wt-% of oxide. Additional amounts of SiO$_2$ may also be directly added to the mixture, but preferably, for purposes of this invention, the total amount of SiO$_2$ introduced into the mixture (inherently and directly) is no greater than 5 wt-% of the total weight of the Si$_3$N$_4$. The amount of Al$_2$O$_3$ introduced naturally through the AlN powder typically ranges from about 1.5 to about 6.0 wt-%, based on the total weight of the AlN. Additional amounts of Al$_2$O$_3$ may also be directly added to the mixture, but preferably, for purposes of this invention, the total amount of Al$_2$O$_3$ introduced into the mixture (inherently and directly) is no greater than 6.0 wt-% of the total weight of the AlN.

At least one oxygen or nitrogen derivative of an element selected from the metal group consisting of Li, Na, Mg, Ca, Sr, Ce, Y, Nd, Sm, Gd, Dy, Er, and Yb is added to the mixture. The "oxygen or nitrogen derivative" includes any compound of oxygen, nitrogen, or both oxygen and nitrogen, wherein the compound has at least one element from the above identified metal group. The oxygen or nitrogen derivative may be added in any amount provided the SiAlON ceramic material of this invention is formed. Preferably, the oxygen or nitrogen derivative is added in an amount between about 0.1 wt-% and about 20.0 wt-% based on total weight of the mixture, wherein the wt-% is calculated as that of the oxide form of the derivative. One skilled in the art will be able to convert a wt-% of any oxygen or nitrogen derivative (e.g. $CaCO_3$) to the equivalent wt-% in its oxide form (e.g. CaO). More preferably, the oxygen or nitrogen derivative is added in an amount between about 0.5 wt-% and about 10 wt-% based on total weight of the mixture.

To obtain SiAlON ceramic materials having no greater than three volume percent glassy phase as measured from SEM and TEM photomicrographs, AlN must be introduced in an amount sufficient to allow formation of a desired amount of alpha-SiAlON, and in addition, sufficient to convert the oxides ($SiO_2$ and $Al_2O_3$) into the beta-SiAlON phase. AlN is responsible, in one role, for reacting with the $Si_3N_4$ and the oxygen or nitrogen derivative(s) to form the alpha-SiAlON phase. In another role, in order to prevent or minimize formation of intergranular amorphous phases, an additional amount of AlN is required in order to react with the $SiO_2$, $Al_2O_3$, and $Si_3N_4$ to form beta-SiAlON. Adding additional $Si_3N_4$ is not necessary to form the beta-SiAlON in this invention since the amount of $Si_3N_4$ added (from about 70 to about 95 wt-%) will be sufficient to form both alpha- and beta-SiAlON phases.

The amount of AlN added must, however, be less than an amount necessary to form AlN polytypoids. For a discussion of AlN polytypoids, see Cannard et al., "The Formation of Phases in the AlN-rich Corner of the Si—Al—O—N System," 8 *J. Eur. Ceramic Soc.* 375-82 (1991), and Bergman, "The Si—Al—O—N System at Temperatures of 1700°–1775° C.", 8 *J. Eur. Ceramic Soc.* 141-51 (1991). Formation of AlN polytypoids can adversely affect mechanical properties of the SiAlON material by lowering both the melting point and the oxidation resistance. The existence of AlN polytypoids may be measured by such methods as XRD analysis. For purposes of this invention, it is possible that an amount of AlN polytypoids that is below the detection limit of typical XRD analysis (less than about 2 wt-%) may form without adversely affecting the material. Thus, addition of an amount of AlN that forms less than the XRD analysis AlN polytypoid detection limit is considered within the scope of this invention and "less than an amount necessary to form AlN polytypoids."

Preferably, the amount of AlN in wt-% is between about $1.3X+0.08Y-0.0045XY$ and about $1.3X+0.2Y-0.0024XY$, wherein "X" is the wt-% of the $SiO_2$ based on total weight of the $Si_3N_4$ and "Y" is a wt-% of alpha-SiAlON phase desired in the ceramic material. As discussed previously, one skilled in the art may also convert the wt-% of $SiO_2$ to an equivalent oxygen content. For example, if "X'" is equal to oxygen content (instead of $SiO_2$ content) based on total weight of the $Si_3N_4$, the amount of AlN is between about $2.4X'+0.08Y-0.008X'Y$ and about $2.4X'+0.2Y-0.004X'Y$, wherein "Y" is the wt-% of alpha-SiAlON phase desired in the ceramic material.

Generally, if a molar ratio of total $SiO_2$ to total $Al_2O_3$ is at least 25 to 1, the desirable amount of AlN is closer to a lower limit of $1.3X+0.08Y-0.0045XY$. In contrast, the desirable amount of AlN is closer to an upper limit of $1.3X+0.2Y-0.0024XY$ if a molar ratio of total $SiO_2$ to total $Al_2O_3$ is less than 25 to 1.

As discussed previously, a preferred multiphase SiAlON ceramic material comprises an alpha-SiAlON phase expressed by the chemical formula $M_x(Si,Al)_{12}(O,N)_{16}$, where $0<x<2$, and M is a multicationic mixture of Sr, Ca, and Y. This ceramic material preferably has an alpha:beta-SiAlON phase wt-% ratio of 20:80. A preferred method for forming this ceramic material is, first, to form a precursor mixture containing about 92.7 wt-% $Si_3N_4$ having about 2.3 wt-% $SiO_2$ based on total weight of the $Si_3N_4$, about 5.5 wt-% AlN having about 2.1 wt-% $Al_2O_3$ based on the total weight of the AlN, about 0.5 wt-% SrO, about 0.3 wt-% CaO, and about 1.0 wt-% $Y_2O_3$, all wt-%'s, unless otherwise indicated, being based on the total weight of the precursor mixture. This mixture may then be densified by the method of this invention (discussed infra).

The desirable preparation of a finely-divided powder mixture containing the precursor materials may be accomplished in any suitable manner with conventional apparatus. A preferred method of preparing the precursor mixture includes attrition milling, with attritor media, preferably zirconia balls, in a carrier medium (or solvent) for a period of time sufficient to form a finely-dispersed suspension. The preparation of the finely-dispersed suspension requires no particular order of addition of the precursor materials to the carrier medium. After attrition milling, excess carrier medium is removed by filtration or otherwise. The mixture is then dried and separated from the attritor media to yield a product having substantially the same proportions as the original ingredients.

The carrier medium may be any inorganic or organic compound which is a liquid at room temperature and atmospheric pressure. Examples of suitable carrier media include: water; alcohols, such as methanol, ethanol and isopropanol; ketones, such as acetone and methyl ethyl ketone; aliphatic hydrocarbons, such as pentanes and hexanes; and aromatic hydrocarbons, such as benzene and toluene. The carrier medium is desirably aqueous. The function of the carrier medium is to impart a viscosity suitable for mixing the solid powders. Any quantity of carrier medium which achieves this purpose is sufficient and acceptable. Preferably, a quantity of carrier medium is employed such that the solids content is in a range from about 15 volume percent to about 50 volume percent based on a total volume of the suspension. Below the preferred lower limit, the viscosity of the solid suspension may be too low and deagglomeration mixing may be ineffective. Above the preferred upper limit, the viscosity may be too high, and deagglomeration mixing may be difficult.

If the carrier medium is toluene, a coupling agent, such as an aluminate coupling agent commercially available from Kenrich Petrochemicals under the trade designation KEN-REACT KA 322, may be used to aid in forming a suspension. When using an alcohol such as methanol, a dispersant such as a polyethyleneimine may be used to facilitate mixing and a flocculant such as oleic acid may be used to ease recovery of the powder mixture. When using water, an amino-alcohol dispersant such as AMP98 from Angus Chemical Co. may be used to facilitate mixing. To limit the tendency of active nitrides (e.g. AlN) to hydrolyze in the presence of moisture, the active nitrides are generally not added into the mixture until the last approximately 15 minutes of milling.

To aid in the dispersion of components of the powder mixture, one or more surfactants or dispersants can be added to the suspension. The choice of surfactant(s) or dispersant(s) can vary widely as is well-known in the art. Any amount of surfactant or dispersant is acceptable provided dispersion of powder mixture components is improved. Typically, the amount of surfactant is in a range of from about 0.01 to 2.0 wt-% of the powder mixture.

The components of the powdered combination are added to the carrier medium in any manner which gives rise to a finely dispersed suspension of the components. Typically, the process is conducted in a large vessel at room temperature under air with vigorous stirring. Any common mixing means is suitable, such as a ball-milling device or an attritor mixer. An ultrasonic vibrator may be used in a supplementary manner to break down smaller agglomerates. The attrition mixer is preferred.

Once mixed, the finely-dispersed suspension is ready for processing into greenware for eventual sintering. For example, the suspension can be slip-cast by techniques well-known in the art. Alternatively, the suspension can be dried into a powder and ground for use in a hot-pressing process. A typical process is disclosed in Pyzik, U.S. Pat. No. 5,120,328, col. 9, lines 31–65 (incorporated herein by reference). Drying may be accomplished by standard drying means, such as by spray-drying or oven drying. Preferably, drying of the admixture of the powder mixture and the attritor balls is accomplished in an oven under a nitrogen purge after removal of excess carrier medium. During the drying process, additional free carrier medium is removed. The temperature of the drying depends on the boiling point of the carrier medium employed. Typically, the drying process is conducted at a temperature just below the boiling point of the carrier medium under atmospheric pressure. After drying, the resulting powder is separated from the attritor media or balls and sieved through a screen to obtain a powder which then may be densified.

Any method of densifying the powder will suffice provided the ceramic material of this invention is formed. The preferred method of densifying the powder mixture is by either hot-pressing, hot isostatic pressing (HIP), or gas pressure sintering, each of which is a well known method of densification in the art. Most preferably, the method is hot-pressing, which comprises heating the powder under pressure to obtain the densified ceramic body. Any standard hot-pressing equipment is acceptable, such as a graphite die equipped with a heating means and a hydraulic press. Particularly suitable results are obtained when the die is fabricated from a material which is substantially non-reactive with components of the powder mixture at hot-pressing temperatures and has a mean linear coefficient of expansion greater than that of the SiAlON. Hot-pressing may be conducted under an inert atmosphere, such as nitrogen, to prevent oxidation and decomposition of the $Si_3N_4$ at high temperatures. The direction of pressing is uniaxial and perpendicular to the plane of the die plates.

Any processing temperature and pressure will suffice providing the novel SiAlON ceramic material of this invention, described herein, is obtained. Typically, however, the temperature for hot-pressing is between about 1550° C. and 1950° C. Preferably, the temperature is maintained within a range of from about 1750° C. to about 1950° C. during pressurizing. More preferably, the range is from about 1825° C. to about 1925° C. At these temperatures for hot-pressing, a pressure of between about 20 MPa and about 40 MPa is typically applied in order to attain substantially full densification.

It is noted that the accurate measurement of high temperatures, such as those quoted hereinabove, is technically difficult. Some variation in the preferred temperature range may be observed depending on the method employed in measuring the temperature. The preferred temperatures of this invention are measured by a tungsten-rhenium thermocouple, obtained from and calibrated by the Omega Company.

Generally, when densifying the mixture by HIP, a pressure of between about 10 MPa and 200 MPa is applied at a temperature of between about 1550° C. to about 2100° C. However, when densifying the mixture by gas pressure sintering a typical pressure of between about 1 MPa and 10 MPa is applied at a temperature of between about 1650° C. to about 2050° C.

The amount of time that the powder mixture is heated under pressure should be sufficient to bring the powder to essentially complete densification. Those skilled in the art will be able to determine suitable times without undue experimentation. For example, ram movement during hot-pressing is a good indicator of the extent of densification. As long as the ram continues to move, densification is incomplete. When the ram has stopped moving for at least about 15 minutes, the densification is essentially complete at about at least 95 percent or greater of the theoretical value. Preferably, the density of the material is greater than about 97 percent of the theoretical value when ram movement stops. Most preferably, the density of the material is greater than about 99 percent of the theoretical value when ram movement stops. Thus, the time required for hot-pressing is the time during ram movement plus about an additional 15 to 30 minutes. Preferably, the time is within a range of from about 15 minutes to about 5 hours; more preferably, from about 30 minutes to about 90 minutes; and most preferably, about 45 minutes to about 75 minutes.

The methods of densification, described hereinbefore, allow for the formation of SiAlON ceramic articles which can be used for such applications as cutting tools and engine components, particularly high wear and high temperature components. A variety of shapes can be made; one common shape being a flat plate. Articles such as cutting tools can be fabricated by slicing and grinding these plates into a variety of appropriate shapes.

Illustrative Embodiments

The following examples serve to illustrate the novel, dense, SiAlON ceramic materials of this invention and the method of preparing said materials. The examples are not intended to limit the scope of this invention.

The $Si_3N_4$ powder is commercially available from Ube Industries, Ltd. under the trade designation SN-E10. It contains: 1.2 wt-% oxygen; less than 100 ppm Cl; less than 100 ppm Fe; less than 50 ppm Ca; and less than 50 ppm Al. It has a crystallinity of greater than 99.5 percent, a ratio of $\beta/(\alpha+\beta)$ of less than 5, and a surface area of 11.2 m²/g. Tokuyama Soda Kabushiki Kaisha supplies AlN powder which has 0.9 wt-% oxygen. Moly Corp. supplies $Y_2O_3$, and Alfa Products supplies MgO, SrO, $Al_2O_3$, and $SiO_2$. Aldrich Chemical Co. supplies CaO. Zirconia, in the form of zirconia balls, is available from Union Process.

EXAMPLE 1

A series of precursor mixtures is prepared using the components and wt-% amounts identified as Mixtures (A)–(D) in Table I, infra. Each mixture is formulated to produce a SiAlON ceramic material having a nominal 20 wt-% alpha phase. "Nominal" alpha-SiAlON content refers to a calculated alpha-SiAlON content in a theoretical precursor mixture wherein no surface oxides exist in the mixture. Mixture A is not formulated to compensate for any $SiO_2$ and $Al_2O_3$; Mixture B is formulated to compensate for half of the $SiO_2$ and $Al_2O_3$; and Mixtures C and D are formulated, under the method of this invention, to compensate for all of the $SiO_2$ and $Al_2O_3$.

The precursor mixtures are formed into greenware by, first, attrition milling each mixture separately in an attritor (Union Process batch attritor, Model 01HD—750 cc capacity with polytetrafluoroethylene coated tube and stirrer) containing zirconia balls and a carrier medium with a stirring rate of 300 revolutions per minute (rpm) and for a mixing time of 1 hour to form a slurry. Methanol is used as the carrier medium in an amount sufficient to provide a solids content of 15 to 30 volume percent solids. The slurry is poured through a 400 mesh (37 μm) plastic sieve to remove the zirconia balls, then dried in a 65° C. oven. Finally, the dried powder is sieved through 60 mesh (180 μm) screen to form a finely-divided powder mixture.

TABLE I

About 85 grams of each powder mixture is densified by either hot pressing or HIP as discussed supra, and specifically identified in Tables II–V, to form billets having an approximate size of 1.27cm×3.81 cm×5.08 cm for samples that are hot-pressed and 5 cm×2.0cm×5.8 cm for samples that are densified by HIP. These samples are identified in the tables as Sample Numbers 1–7. Table II identifies Mixtures (A)(C) which are hot pressed under flowing nitrogen at a pressure of 35 MPa. Sample Numbers 1–3 in Table II are hot pressed for 1 hour at 1825° C. and Sample Numbers 4–5 are hot pressed an additional 5 hours at 1925° C. Tables III–V identify Mixtures (A)–(D) which are densified by HIP under the following varying conditions: Table III densifies by HIP for 1 hour at 1825° C.; Table IV increases the amount of time at HIP to 2 hours at the same temperature; and Table V densifies for 1 hour, but increases the temperature of the HIP to 1925° C.

Each of Tables II–V report various properties for each Sample Number. The density of each Sample Number is measured by the water immersion method, as described in Richerson et al., *Modern Ceramic Engineering* (1982), and the volume percent (v/o) of intergranular amorphous phase ("glass content") is measured by SEM and TEM photomicrographs. Vicker's hardness, Palmqvist Toughness, fracture toughness, room temperature strength, flexure strength, flexure strength retention, and oxidation resistance are also measured. Results of each table are briefly discussed below each respective table.

TABLE II

| | Prepared By Hot Press | | | | |
|---|---|---|---|---|---|
| Sample Number | 1* | 2* | 3 | 4* | 5 |
| Mixture | A | B | C | A | C |
| Hot Press Condition (°C./hrs.) | 1825/1 | 1825/1 | 1825/1 | 1825/1 + 1925/5 | 1825/1 + 1925/5 |
| Density gm/cc | 3.217 | 3.216 | 2.50 | 3.218 | 3.212 |
| (% Theoretical Density) | (99.9%) | (99.9%) | (77.5%) | (99.9%) | (99.6%) |
| Glass Content, v/o | 6.3 | 4.5 | <1 | 6.8 | <1 |
| Vicker's Hardness (14 Kg load), Kg/mm² | 1694 | 1811 | <1000 | 1694 | 1901 |
| Palmqvist Toughness, Kg/mm | 45.7 | 38.3 | — | 38.8 | 32.3 |
| Fracture Toughness (MPa · m$^{\frac{1}{2}}$) | 6.2 | 6.1 | — | 7.6 | 5.8 |
| Room Temperature Strength, MPa | 902 | 837 | — | 885 | 723 |
| Flexure Strength Retention at 1375° C. (%) | 55 | 60 | — | 46 | 76 |
| Oxidation, Weight Gain (mg/cm²) | | | | | |
| 1400° C. - 100h | 0.93 | 0.70 | — | 0.98 | 0.21 |
| 1500° C. - 50h | 5.01 | 4.18 | — | 5.33 | 0.60 |
| Oxidized Products | cristobalite Y—Al-silicate | cristobalite Y-silicate | — | cristobalite Y—Al-silicate | cristobalite |

*This Sample is not an embodiment of the invention.

| Mixture | $Si_3N_4$ | $Y_2O_3$ | SrO | CaO | AlN |
|---|---|---|---|---|---|
| Mixture A | 95.33 | 1.01 | 0.56 | 0.25 | 2.85 |
| Mixture B | 94.06 | 0.97 | 0.54 | 0.25 | 4.19 |
| Mixture C | 92.73 | 0.96 | 0.53 | 0.24 | 5.54 |
| Mixture D | 91.43 | 0.95 | 0.52 | 0.24 | 6.86 |

Sample Numbers 1, 2, and 4 have too much glass (>3 v/o) and have less oxidation resistance and strength retention than Sample Number 5, which was prepared from a precursor material mixture formulated and processed in accordance with the present invention. Sample Number 3 is the same precursor material mixture as Sample Number 5, having a glass content less than 1 volume percent, but the density is low (77.5%). Increasing the temperature and time at hot press on Sample Number 3 produces Sample Number 5, a substantially fully dense (99.6%) material which still has a glass content less than 1 volume percent.

TABLE III

| | Prepared By HIP | | | |
|---|---|---|---|---|
| Sample Number | 6* | 7* | 8 | 9 |
| Mixture | A | B | C | D |
| Hot Isostatic Press Condition (°C./MPa/hrs) | 1825/40/1 | 1825/40/1 | 1825/40/1 | 1825/40/1 |

TABLE III-continued

| | Prepared By HIP | | | |
|---|---|---|---|---|
| Sample Number | 6* | 7* | 8 | 9 |
| Density gm/cc | 3.220 | 3.216 | 3.216 | 3.219 |
| (% Theoretical Density) | (100%) | (99.9%) | (99.9%) | (99.7%) |
| Glass Content, v/o | 6.1 | 4.6 | <1 | <1 |
| Vicker's Hardness (14 Kg load), Kg/mm$^2$ | 1727 | 1889 | 1931 | 1914 |
| Palmqvist Toughness, Kg/mm | 45.2 | 38.1 | 35.0 | 26.8 |
| Fracture Toughness (MPa · m$^{\frac{1}{2}}$) | 6.5 | 6.3 | 5.6 | 5.1 |
| Flexure Strenth Retention at 1375° C. (%) | 53 | 58 | 75 | 80 |
| Oxidation, Weight Gain mg/cm$^2$ 1500° C. for 50 hrs | 506 | 4.5 | 0.63 | 0.57 |
| Oxidation Products | cristobalite Y—Al-silicate | cristobalite Y—Al-silicate | cristobalite | cristobalite |

*This Sample is not an embodiment of the invention.

Sample Numbers 6 & 7 have too much glass (>3 v/o) and have less oxidation resistance and strength retention than Sample Numbers 8 & 9, which have been prepared from precursor material mixtures formulated and processed in accordance with the present invention.

TABLE IV

| | Prepared by HIP | | | |
|---|---|---|---|---|
| Sample Number | 10* | 11* | 12 | 13 |
| Mixture | A | B | C | D |
| Hot Isostatic Press Condition (°C./MPa/hrs) | 1825/40/2 | 1825/40/2 | 1825/40/2 | 1825/40/2 |
| Density gm/cc | 3.210 | 3.209 | 3.220 | 3.213 |
| (% Theoretical Density) | (100%) | (99.7%) | (99.8%) | (99.5%) |
| Glass Content, v/o | 5.9 | 4.3 | <1 | <1 |
| Vicker's Hardness (14 Kg load), Kg/mm$^2$ | 1694 | 1811 | 1901 | 1889 |
| Palmqvist Toughness, Kg/mm | 36.2 | 39.5 | 35.5 | 26.3 |
| Flexure Strenth Retention at 1375° C. (%) | 46 | 56 | 73 | 80 |
| Oxidation, Weight Gain mg/cm$^2$ 1500° C. for 50 hrs | 5.2 | 4.4 | 0.60 | 0.59 |
| Oxidation Products | cristobalite Y—Al-silicate | cristobalite Y—Al-silicate | cristobalite | cristobalite |

*This Sample is not an embodiment of the invention.

Materials 10 & 11 have too much glass (>3 v/o) and have less oxidation resistance and strength retention than Sample Numbers 12 & 13, which have been prepared from precursor material mixtures formulated and processed in accordance with the present invention.

TABLE V

| | Prepared By HIP | | | |
|---|---|---|---|---|
| Sample Number | 14* | 15* | 16 | 17 |
| Mixture | A | B | C | D |
| Hot Isostatic Press Condition (°C./MPa/hrs) | 1925/40/1 | 1925/40/1 | 1925/40/1 | 1925/40/1 |
| Density gm/cc | 3.218 | 3.216 | 3.216 | 3.215 |
| (% Theoretical Density) | (99.9%) | (99.9%) | (99.7%) | (99.5%) |
| Glass Content, v/o | 6.2 | 4.5 | <1 | <1 |
| Vicker's Hardness (14 Kg load), Kg/mm$^2$ | 1634 | 1654 | 1833 | 1890 |
| Palmqvist Toughness, Kg/mm | 35.9 | 41.7 | 37.7 | 31.4 |
| Oxidation, Weight Gain mg/cm$^2$ 1500° C. for 50 hrs | 5.5 | 4.6 | 0.63 | 0.58 |
| Oxidation Products | cristobalite Y—Al-silicate | cristobalite Y—Al-silicate | cristobalite | cristobalite |

*This Sample is not an embodiment of the invention.

Materials 14 & 15 have too much glass (>3 v/o) and have less oxidation resistance than Sample Numbers 16 & 17, which have been prepared from precursor material mixtures formulated and processed in accordance with the present invention.

EXAMPLE 2

A series of precursor mixtures is prepared using the methods described in Example 1, with the exception that each mixture is formulated to have a different alpha-SiAlON content. These mixtures are identified as Mixtures (E)–(H) in Table VI, infra. Mixtures F and H are formulated, under the method of this invention, to compensate for the SiO$_2$ and Al$_2$O$_3$.

TABLE VI

| Mixture | Si$_3$N$_4$ | Y$_2$O$_3$ | SrO | CaO | AlN |
|---|---|---|---|---|---|
| E | 97.99 | 0.32 | 0.17 | 0.25 | 1.27 |
| F | 95.15 | 0.31 | 0.17 | 0.24 | 4.13 |
| G | 87.71 | 3.00 | 1.66 | .025 | 7.38 |
| H | 85.43 | 2.92 | 1.61 | 0.24 | 9.79 |

Mixtures (E)–(H) are each hot pressed under flowing nitrogen at 35 MPa under conditions set out in Table VII to form billets of approximate size 1.27 cm×3.81 cm×5.08 cm, identified as Sample Numbers 18–21. In this table "nominal" alpha-SiAlON content refers to the alpha-SiAlON content present in a theoretical composition wherein no surface oxides exist in starting materials. "Measured" refers to actual alpha-SiAlON content which is present in the composition as measured by XRD. Table VII reports various properties for each Sample Number. Results of the table are briefly discussed below the table.

TABLE VII

| | Prepared By Hot Press | | | |
|---|---|---|---|---|
| Sample Number | 18* | 19 | 20* | 21 |
| Composition | E | F | G | H |
| Hot Press Condition (°C./hrs) | 1825/1 | 1825/1 + 1925/1 | 1825/1 | 1825/1 |
| Density, gm/cc (% Theoretical Density) | 3.205 (100%) | 3.083 (96.2%) | 3.242 (99.8%) | 3.247 (99.9%) |
| Glass Content, v/o | 4.8 | <1 | 9.5 | 2.8 |
| α-SiAlON content, w/o | | | | |
| nominal | 10 | 10 | 50 | 50 |
| measured | 0 | 12 | 70 | 47 |
| Vicker's Hardness (14 Kg load), Kg/mm$^2$ | 1737 | 1873 | 1931 | 2110 |
| Palmqvist Toughness, Kg/mm | 28.1 | 33.5 | 29.5 | 26.9 |
| Oxidation Weight Gain, mg/cm$^2$ 1500° C. for 50 hrs | 6.0 | 0.51 | 6.7 | 0.93 |

*This Sample is not an embodiment of the invention.

By adjusting the amount of AlN to compensate for surface oxides (calculated as $SiO_2$ and $Al_2O_3$) by the method of this invention in Sample Numbers 19 and 21, the amount of glass is less than in Sample Numbers 18 and 20, and the actual alpha-SiAlON content is close to the nominal alpha-SiAlON content. One may also note that Sample Number 19 has been densified under hot press conditions for an additional one hour at 1925° C. However, as demonstrated in Table II, additional time and temperature at hot press conditions has minimal effect on glass content in the materials of this invention, but is advantageous for increasing the density.

EXAMPLE 3

A series of precursor mixtures is prepared using the methods described in Example 2. These mixtures are identified as Mixtures (I)–(L) in Table VIII, infra. Mixtures J and L are formulated, under the method of this invention, to compensate for the $SiO_2$ and $Al_2O_3$.

TABLE VIII

| Mixture | Si$_3$N$_4$ | Y$_2$O$_3$ | MgO | CaO | AlN |
|---|---|---|---|---|---|
| I | 96.27 | 0.60 | 0.33 | 0.25 | 2.54 |
| J | 93.55 | 0.59 | 0.32 | 0.24 | 5.30 |
| K | 94.89 | 1.94 | 0.00 | 0.00 | 3.17 |
| L | 92.25 | 1.88 | 0.00 | 0.00 | 5.87 |

Mixtures (I)–(L) are each hot pressed under flowing nitrogen at 35 MPa under conditions set out in Table IX to form billets of approximate size 1.27 cm× 3.81 cm×5.08 cm, identified as Sample Numbers 22–25. Table IX reports various properties for each Sample Number. Results of the table are briefly discussed below the table.

TABLE IX

| | Prepared By Hot Press | | | |
|---|---|---|---|---|
| Sample Number | 22* | 23 | 24* | 25 |
| Mixture | I | J | K | L |
| Hot Press Condition (°C./hrs) | 1825/1 | 1825/1 + 1925/1 | 1825/1 | 1825/1 + 1925/1 |
| Density, gm/cc (% Theoretical Density) | 3.216 (100%) | 3.205 (99.7%) | 3.225 (100%) | 3.210 (99.5%) |
| Glass Content, v/o | 5.3 | <1 | 5.2 | <1 |
| α-SiAlON content, w/o | | | | |
| nominal | 20 | 20 | 30 | 30 |
| measured | 0 | 23 | 5 | 36 |
| Vicker's Hardness (14 Kg load), Kg/mm$^2$ | 1655 | 1815 | 1849 | 1989 |
| Palmqvist Toughness, Kg/mm | 32.5 | 34.1 | 36.8 | 31.2 |
| Oxidation Weight Gain, mg/cm$^2$ 1500° C. for 50 hrs | 5.8 | <1 | 4.9 | <1 |

*This Sample is not an embodiment of the invention.

This example demonstrates that the invention is also applicable to both multi-cation (Y—Mg—Ca)-SiAlON and single-cation (e.g., Y-SiAlON) systems. Sample Numbers 23 and 25, formulated under the method of this invention, both have glass contents less than 1 volume percent.

Therefore, from the results of Examples 1–3, as shown in Tables I–IX, it can be seen that the invention provides a ceramic material which exhibits excellent oxidation resistance and strength retention at elevated temperatures, and good room temperature toughness and hardness. The present material may have these superior properties due to the reduction of intergranular amorphous phase in SiAlON having both alpha- and beta-SiAlON phases. This reduction of glassy phase seems to yield a material which has superior properties over prior art materials.

While the invention has been described in terms of specific embodiments, it will be appreciated that other embodiments could readily be adapted by one skilled in the art. Accordingly, the scope of the invention is to be limited only by the following claims.

What is claimed is:

1. A SiAlON ceramic material having no greater than 3 volume percent of intergranular amorphous phase and consisting essentially of:
   (a) a first phase of alpha-SiAlON represented by the general formula $M_x$ $(Si,Al)_{12}$ $(O,N)_{16}$, wherein $0<x\leq2$ and M is at least one cationic element selected from the group consisting of Li, Na, Mg, Ca, Sr, Ce, Y, Nd, Sm, Gd, Dy, Er, and Yb; and
   (b) a second phase of beta-SiAlON represented by the general formula $Si_{6-y}Al_yO_yN_{8-y}$, wherein $0<y<4.3$;
wherein the SiAlON ceramic material has a fracture toughness of at least 5.0 MPa $(m)^{\frac{1}{2}}$.

2. The ceramic material of claim 1, wherein $0<y<1$.

3. The ceramic material of claim 1, wherein the volume percent of intergranular amorphous phase is no greater than 1 volume percent.

4. The ceramic material of claim 1, wherein oxidation of the material is no greater than 0.25 mg/cm$^2$ at 1400° C. for 100 hours.

5. The ceramic material of claim 1, wherein the oxidation of the material is no greater than 1.00 mg/cm$^2$ at 1500° C. for 50 hours.

6. The ceramic material of claim 1, wherein density of the material is greater than about 95 percent of the theoretical value.

7. The ceramic material of claim 1, wherein the alpha-SiAlON and beta-SiAlON are present in an alpha:beta weight ratio that is from about 1:99 to about 90:10.

8. The ceramic material of claim 1, wherein the alpha-SiAlON and beta-SiAlON are present in an alpha:beta weight ratio that is from about 10:90 to about 40:60.

9. The ceramic material of claim 1, wherein M is a multicationic mixture of Sr, Ca, and Y or a multicationic mixture of Mg, Ca, and Y.

10. The ceramic material of claim 1, wherein the flexure strength retention of the material is at least 55 percent at 1375° C. in air.

11. A method of producing a SiAlON ceramic material having no greater than 3 volume percent of intergranular amorphous phase and consisting essentially of an alpha-SiAlON phase and a beta-SiAlON phase, the method consisting essentially of subjecting a mixture of precursor materials to a pressure, temperature, and period of time sufficient to densify the mixture, wherein the precursor materials comprise $Si_3N_4$, AlN, optionally $SiO_2$, optionally $Al_2O_3$, and at least one oxygen or nitrogen derivative of an element selected from the group consisting of Li, Na, Mg, Ca, Sr, Ce, Y, Nd, Sm, Gd, Dy, Er, and Yb, and wherein $SiO_2$, including surface oxide from $Si_3N_4$, is present in the mixture in an amount no greater than 5 weight percent of the total weight of the $Si_3N_4$, $Al_2O_3$, including surface oxide from AlN, is present in the mixture in an amount no greater than 6 weight percent based on total weight of the AlN, the $Si_3N_4$ is present in the mixture in a range from about 70 to about 95 weight percent based on total weight of the mixture, and the AlN is present in the mixture in a weight percent range, based on the total weight of the mixture, of from about $1.3X+0.08Y-0.0045XY$ to about $1.3X+0.2Y-0.0024XY$, wherein X is the weight percent of the $SiO_2$ based on total weight of the $SiO_3N_4$ and Y is from about 1 to about 90 and is equal to a weight percent of alpha-SiAlON phase desired in the ceramic material.

12. The method of claim 11, further comprising a step of attrition milling the mixture with attritor media in carrier medium, followed by drying and separating the mixture from the attritor media before densification.

13. The method of claim 11 wherein the densifying is by hot pressing the mixture at a pressure of between about 20 MPa and about 40 MPa, a temperature of between about 1550° C. to about 1950° C., and for a period of time between about 1 to about 5 hours.

14. The method of claim 11 wherein the densifying is by hot isostatic pressing the mixture at a pressure of between about 10 MPa and 200 MPa, a temperature of between about 1500° C. to about 2100° C., and for a period of time of about 1 hour.

15. The method of claim 11 wherein the densifying is by gas pressure sintering the mixture at a pressure of between about 1 MPa and 10 MPa, a temperature of between about 1650° C. to about 2050° C., and for a period of time between about 1 to about 6 hours.

16. The method of claim 11, wherein the oxygen or nitrogen derivative is present in an amount between about 0.1 and about 20.0 percent by weight based on total weight of the mixture.

17. The method of claim 11, wherein the oxygen or nitrogen derivative is present in an amount between about 0.5 and about 10.0 percent by weight based on total weight of the mixture.

18. The method of claim 11, wherein the oxygen or nitrogen derivative is formed from yttrium, strontium, and calcium, the amount of AlN is between about 5.5 and about 6.9 percent by weight of the total mixture, X is about 2.1, and Y is about 20.

19. The method of claim 18, wherein the oxygen or nitrogen derivative is formed from yttrium, magnesium, and calcium, the amount of AlN is between about 5.3 and about 6.7 percent by weight of the total mixture, X is about 2.1, and Y is about 20.

* * * * *

UNITED STATES PATENT AND TRADEMARK OFFICE
CERTIFICATE OF CORRECTION

PATENT NO. : 5,413,972
DATED : May 9, 1995
INVENTOR(S) : Chinmau J. Hwang, et al.

It is certified that error appears in the above-indentified patent and that said Letters Patent is hereby corrected as shown below:

On title page, under the heading OTHER PUBLICATIONS, line 7, "Persson et al., "Oxidation Behaniour and Mechanical", should correctly read --Persson et al., "Oxidation Behaviour and Mechanical--.

On title page, under the heading OTHER PUBLICATIONS, line 12, "n-Oxide Structural Ceramics", MRS Bulleta in 18(9)", should correctly read --n-Oxide Structural Ceramics", MRS Bulletin in 18(9)--.

Column 18, line 1, "$SiO_3N_4$ and Y is from about 1 to about 90 and is" should correctly read --$Si_3N_4$ and Y is from about 1 to about 90 and is--.

Signed and Sealed this

Twenty-first Day of May, 1996

Attest:

BRUCE LEHMAN

*Attesting Officer*  *Commissioner of Patents and Trademarks*